Figure 1:
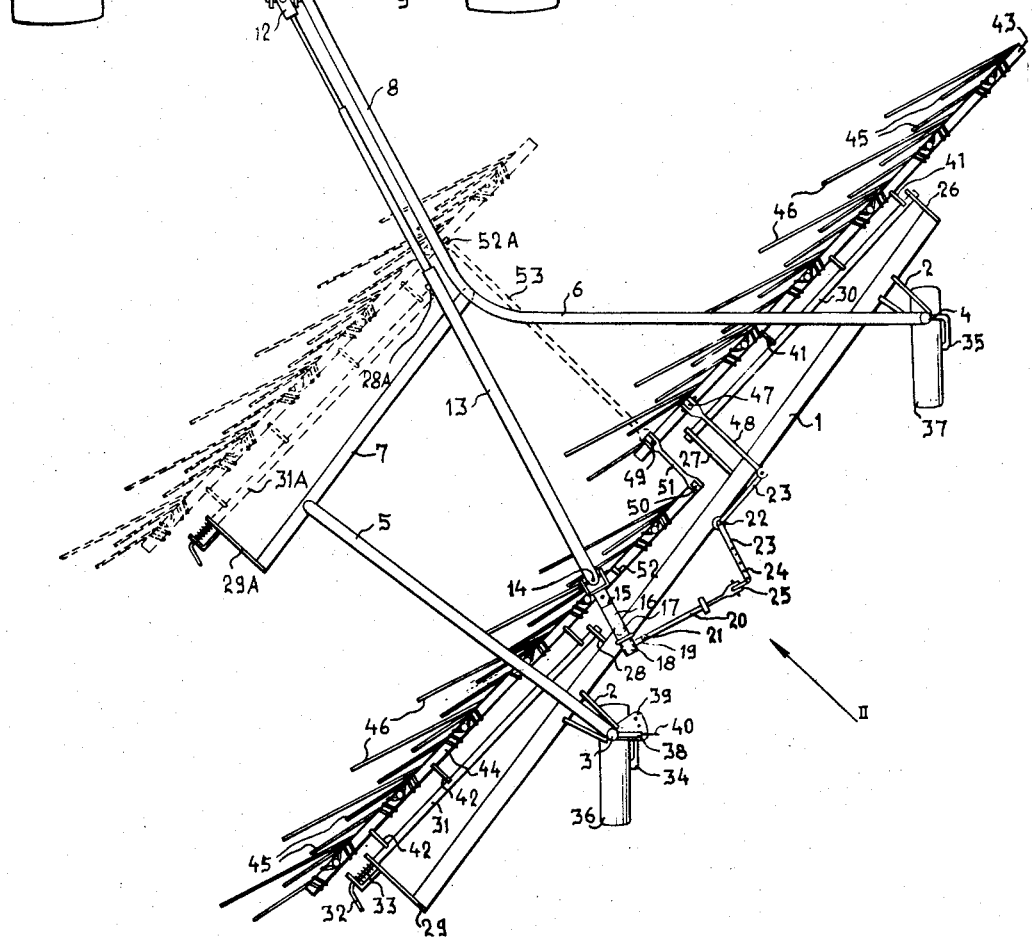

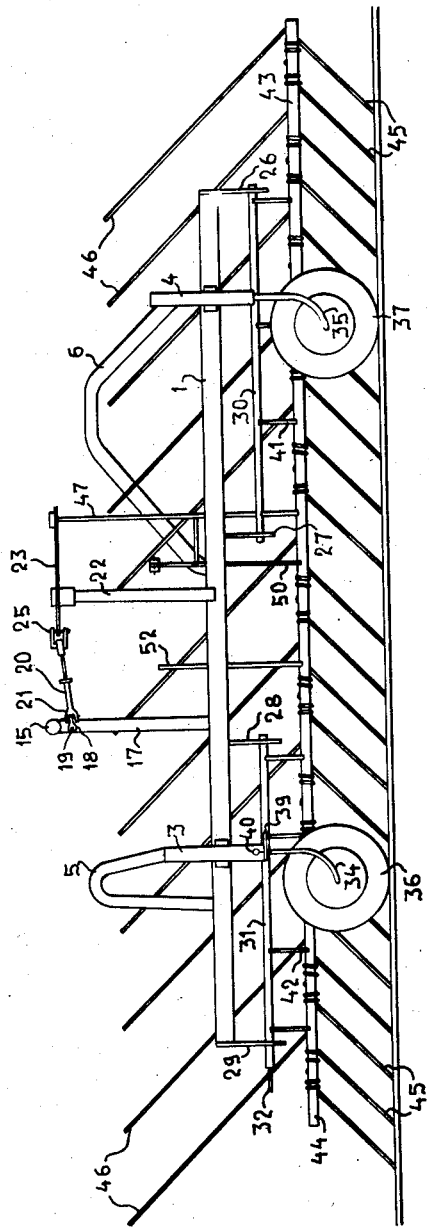

United States Patent Office 2,837,888
Patented June 10, 1958

2,837,888
SIDE DELIVERY RAKE PROVIDED WITH OSCILLATING RAKING FINGERS

Cornelis van der Lely and Ary van der Lely, Maasland, Netherlands, assignors to C. van der Lely N. V., Maasland, Netherlands, a Dutch limited company Application May 13, 1955, Serial No. 508,226
Claims priority, application Netherlands June 1, 1954
16 Claims. (Cl. 56—376)

This invention relates to devices for laterally displacing crop lying upon the ground by means of one or more raking members.

The invention contemplates a device provided with a row of catching or raking means which remain continuously in close proximity to the ground and defining a line which is oblique with regard to the line of draft of the device.

It is an object of the present invention to provide an improved raking device which is satisfactory for very different working conditions. According to the invention, means are provided so that the raking means perform a movement having components transverse and along the aforesaid line. This movement has in a forward direction with respect to the frame of the device, a velocity which is suddenly reversed, in consequence of which crop gathered on the raking means will be thrown off. The invention contemplates that crop gathered on the raking means and unfavorably influencing the raking action will be loosened from the raking means by the movement and can then be delivered laterally.

Further features and details will be apparent in the following description and the accomypanying drawings in which a preferred embodiment of the invention has been illustrated by way of example and in which:

Fig. 1 is a plan view of a rake according to the invention and attached to the rear of a tractor, and Fig. 2 is a side elevation of a part of the same device viewed in direction of the arrow II in Fig. 1.

According to Fig. 1, the mobile frame of the device includes a horizontal beam 1 connected to vertical tubes 3 and 4 by means of horizontal bars 2. The frame also includes a bow 5 connected to the tube 3 and a bow 6 connected to the tube 4, which bows 5 and 6 are interconnected at a distance from the beam 1 by means of a shorter beam 7 which is parallel to the beam 1. The bow 6 extends past the beam 7 with a section 8 the foremost extremity of which is fixed detachably to a beam 9 mounted on the rear end of a tractor 10.

The tractor 10 includes an end 11 of an axle, which end is rotated by the motor (not shown) of the tractor. This so-called "power take off" is connected by an advancing or propelling means such as a universal joint 12 to a shaft 13 the length of which can be changed telescopically (the advancing means lies in a line of draft such as indicated by arrow V). The axle 13 drives, by means of a second universal joint 14, an axle 15 supported in a bearing 16 which is connected to the beam 1 by means of a column 17.

The axle 15 carries, at its rearmost end an oscillating means including crank pin 18 upon which a bearing 19 is rotatably supported. The bearing 19 is connected to a driving rod 20 by a hinge 21 the axle for which is at right angles to the axle 15. The beam 1 supports a second vertical column 22 upon which an angle lever 23 is rotatably accommodated.

One of the arms of the angle lever 23 is provided with a number of holes or apertures 24. The driving rod 20 is hingedly connected to an intermediate piece 25 which is connected to the arm provided with holes 24 by means of a hinge pin placed in one of the holes.

The beam 1 also carries four arms 26–29 substantially at right angles to the longitudinal direction of the beam 1 and extending obliquely downwards. The free ends of the arms 26 and 27 define bearings for a horizontal support or shaft 30 whereas the free extremity of the arm 28 forms a bearing for a support or shaft 31.

The free extremity of the arm 29 forms a guide for a pin provided with a handle 32 tending to move in the direction of the arm 28 under the influence of a spring 33.

An extremity of said pin is turned towards arm 28 and constitutes a spindle around which an extremity of the shaft 31 can rotate. By manipulation of the handle 32, the spindle will leave the accommodating hole in the shaft 31 after which the shaft 31 removed and can be placed in position 31A adjacent the beam 7 as represented in dotted lines. The beam 7 carries arms 28A and 29A with the aid of which the shaft 31 is rotatably arranged in the same manner as with the aid of the arms 28 and 29.

In the tubes 3 and 4 are arranged vertical axles connected by means of connecting bars 34 and 35 to horizontal axles of running wheels 36 and 37. These running wheels, together with the bar 8 which is connected to the tractor, support the frame of the device so that the shafts 30 and 31 are horizontal and equally spaced from the ground. In position 31A, the distance from the shaft 31 to the ground is the same as above.

An arm 38 is connected to the tube 3 which arm cooperates with a sector 39 connected to the bar 34 and provided with peripheral holes. By means of a pin 40 engaging in these holes, the sector 39 can be secured against displacement and in various positions relative to the arm 38. Thus, although the wheel 37 is freely pivotal, the wheel 36 can be secured against displacement in various positions controlling the position of the frame with regard to the tractor 10.

The shafts 30, 31 are connected to bars 43, 44, respectively, by means of connecting bars 41, 42. The bar 43 carries a number of raking means such as fingers or teeth 45 which are directed obliquely downwards and which are connected resiliently to the bar 43 such as by winding their extremes around the bar 43. Two teeth 45 may be integral and coupled by a helical spring so as to be formed from one single piece of wire. The middle spring portion is secured on the bar 43. The teeth 45 define an angle of about 45° with the longitudinal direction of the bar 43 and are situated in a common plane.

The bar 43 also carries a number of thin bars 46 also forming an angle of about 45° with the longitudinal direction of the bar 43 and being situated likewise in a common plane. For the teeth 45 as well as for the bars 46, it is to be noted that the extremities are turned away from the bar 43 in a direction which corresponds to the delivery direction for the crop; this delivering direction is directed to the left and according to the longitudinal direction of the bar 43.

In the same manner, the bar 44 is provided with teeth 45 and thin bar-shaped means 46 for restraining crop movement.

The bar 43 carries an upwardly extending arm 47 which is pivotal about a horizontal axle provided on a horizontal connecting rod 48. The rod 48 is hingedly connected about a vertical axis to an arm of the angle lever 23. An arm 49 fixed in close proximity to the bar 44 is parallel to the arm 47 and is likewise directed upwards. In a similar position a similar arm 50 is fixed upon the extremity of the bar 44 which extremity is situated near the bar 43.

The free uppermost extremities of the arms 49 and 50 are hingedly connected by means of a connecting rod 51. The bar 44 carries another arm 52 of the same shape, size and position as the bar 50, which arm comes into operation when the shaft 31 is placed in position 31A. In this case, the connecting rod 51 is removed and the free extremity of the arm 52 in the position 52A is coupled to the free extremity of the arm 49 by means of a connecting rod 53.

The operation of the device is as follows. While the tractor 10 draws the device over the ground along a line of draft V, the end 11 of the axle and consequently the axle 15 rotates, by which rotation the crank pin 18 is moved in a small circle. The bar 20 transforms the circular movement of the crank pin into an oscillating movement of the angle lever 23 which movement is transmitted by means of the connecting rod 48 to the raking member consisting of the bar 43 with the teeth 45 and the bars 46, said raking member thus being an elongated oscillatable support and being able to perform an oscillating before reciprocating movement around the center line of the support section or shaft 30. The other raking member composed of the bar 44 and teeth and stopping means is likewise put into an oscillating movement because the arms 49 and 50 are coupled to the bars 43 and 44 by means of the bar 51. When this last-mentioned raking member is placed in the position represented in dotted lines (Fig. 1) by moving the section or shaft 31 to the position 31A, it will likewise be able to perform an oscillating movement by means of the rod 53 coupled between the arms 52A and 49.

When the raking members are in the position represented in Fig. 1 in solid lines, the crop, e. g. grass or hay, lying upon the strip of ground before the bar 43 will be transported to the left by the teeth 45 of the foremost raking member and this crop with additional crop lying on the strip of ground before the bar 44 will be transported further to the left so that the device works in principle as a side delivery rake. Due to the fast reciprocating movement of the teeth which results, the crop pushing against the teeth is thrown therefrom. Thus, the points of the teeth are kept clean and keep their most favorable raking condition. The crop thus thrown is delivered laterally.

If the teeth 45 are impeded in movement with regard to the frame crop will be gathered on the teeth whose scraping action will be rendered inefficient so that a large part of the crop lying upon the ground will not be delivered.

Preferably the plane of the teeth 45 is not exactly vertical in the middlemost position of movement, but the line of intersection of this plane with the ground is situated slightly ahead of the bar 43.

In consequence of the described position of the teeth, in which position the point of a tooth works downwards and in the direction of the delivering of the material, the teeth 45 will move a small distance from the ground at the position in which they are moved as far forward as possible with regard to the frame. This is beneficial in that the crop being gathered upon the teeth is taken along with the stream of crop flowing off laterally. Because of the described position of the stopping means 46, the crop which is accumulated vertically will tend to move upwards while sliding along said means so that it will be aired.

When the hindmost raking member is moved to the position represented in dotted lines (Fig. 1), the raking members work independently of one another and move the material only over a small distance so that swaths can be turned by means of this device. By the adjusting of the running wheel 36 this swath turner can be adapted to various widths of swaths.

There will now be obvious to those skilled in the art many modifications of the structure set forth which do not depart from the spirit of the invention as defined in the following claims.

What we claim is:

1. A device for laterally displacing material lying on the ground comprising a mobile frame, advancing means lying in a line of draft operatively associated with said frame, raking means on said frame extending at an acute angle to said line of draft, said raking means comprising an elongated oscillatable support, rake fingers extending at an acute angle downwardly from said support, and oscillating means operatively associated with said support whereby said support can be oscillated to move said rake fingers for laterally displacing crop contacted thereby.

2. A device as claimed in claim 1 wherein said rake fingers extend angularly along said support.

3. A device as claimed in claim 1 wherein said support includes separate and relatively displaceable sections.

4. A device as claimed in claim 1 comprising running wheels pivotally coupled to and supporting said mobile frame.

5. A device as claimed in claim 1 comprising running wheels pivotally coupled to and supporting said mobile frame, and a locking device for locking one of said wheels in fixed position relative to said frame.

6. A device as claimed in claim 1 wherein said rake fingers are resiliently coupled to said frame.

7. A device as claimed in claim 1 wherein said rake fingers are connected in pairs.

8. A device as claimed in claim 1 comprising means extending upwardly from said raking means for the guiding of vertically accumulated crop.

9. A device as claimed in claim 1 comprising means for supporting said frame and thereby said support at a predetermined height above the ground, said rake fingers extending from said support by a distance greater than said height.

10. A device as claimed in claim 1 wherein said raking means includes a rotatable shaft and means spacing said oscillatable support from said shaft whereby the support oscillates about said shaft.

11. A device as claimed in claim 1 wherein said oscillating means includes at least one pivotal connection whereby said frame can be adjusted relative to said line of draft independently of at least a portion of said oscillating means.

12. A device as claimed in claim 1 wherein said oscillating means comprises a rotatable shaft and means operatively connecting said shaft with said oscillatable support, said means converting the rotation of said shaft to a reciprocating motion in said support.

13. A device as claimed in claim 1 comprising means for detachably locking said raking means on said frame.

14. A device as claimed in claim 1 comprising means on said frame for supporting at least a part of said oscillatable support in an alternate operative position.

15. A ground-transversing device for laterally displacing material lying on the ground comprising a mobile frame, advancing means coupled to said frame at a predetermined relationship so as to define a direction of travel, raking means on said frame at an acute angle to the direction of travel, said raking means comprising an elongated oscillatable support, rake fingers on said support and extending at an acute angle downwardly therefrom, and oscillating means on said frame and coupled to said support for oscillating said fingers to displace material lying on the ground.

16. A device as claimed in claim 15 wherein said oscillating means comprises means coupled to said support for effecting a reciprocating movement of the same.

References Cited in the file of this patent

UNITED STATES PATENTS

| | | |
|---|---|---|
| 520,320 | Lamm | May 22, 1894 |
| 773,208 | Ketelsen | Oct. 25, 1904 |
| 2,514,699 | Hiatt | July 11, 1950 |

FOREIGN PATENTS

| | | |
|---|---|---|
| 577,054 | France | May 8, 1924 |
| 170,746 | Austria | Mar. 25, 1952 |